(12) United States Patent
Ganesh et al.

(10) Patent No.: US 11,294,850 B2
(45) Date of Patent: Apr. 5, 2022

(54) SYSTEM, APPARATUS AND METHOD FOR INCREASING BANDWIDTH OF EDGE-LOCATED AGENTS OF AN INTEGRATED CIRCUIT

(71) Applicant: Intel Corporaiton, Santa Clara, CA (US)

(72) Inventors: Brinda Ganesh, Portland, OR (US); Yen-Cheng Liu, Portland, OR (US); Swadesh Choudhary, Mountain View, CA (US); Tejpal Singh, Hudson, MA (US); Pradeep Prabhakaran, Holden, MA (US); Monam Agarwal, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1 day.

(21) Appl. No.: 16/369,220

(22) Filed: Mar. 29, 2019

(65) Prior Publication Data

US 2019/0227979 A1 Jul. 25, 2019

(51) Int. Cl.
| | | |
|---|---|---|
| G06F 15/173 | (2006.01) | |
| G06F 15/76 | (2006.01) | |
| G06F 15/80 | (2006.01) | |
| G06F 13/40 | (2006.01) | |
| G06F 115/08 | (2020.01) | |

(52) U.S. Cl.
CPC .... *G06F 15/17381* (2013.01); *G06F 13/4027* (2013.01); *G06F 15/8023* (2013.01); *G06F 2115/08* (2020.01)

(58) Field of Classification Search
CPC ........... G06F 15/17381; G06F 15/7808; G06F 15/7825; G06F 15/7842; G06F 15/7864; G06F 15/7867; G06F 15/7871; G06F 15/8023; G06F 2115/00; G06F 2115/02; G06F 2115/04; G06F 2115/06; G06F 2115/08; G06F 2115/10; G06F 2115/12;
(Continued)

(56) References Cited

U.S. PATENT DOCUMENTS

| 7,804,504 B1* | 9/2010 | Agarwal ............. G06F 15/7867 345/505 |
|---|---|---|
| 2003/0107988 A1* | 6/2003 | Lodha ................. H04L 47/2441 370/229 |

(Continued)

OTHER PUBLICATIONS

Kumar et al., A Network on Chip Architecture and Design Methodology, 2002, IEEE Computer Society, 0-7695-1486-3/02, 57 pages (Year: 2002).*

(Continued)

*Primary Examiner* — Daniel H Pan
(74) *Attorney, Agent, or Firm* — Trop, Pruner & Hu, P.C.

(57) ABSTRACT

In one embodiment, a system on chip includes: a plurality of intellectual property (IP) agents formed on a semiconductor die; a mesh interconnect formed on the semiconductor die to couple the plurality of IP agents, and a plurality of mesh stops each to couple one or more of the plurality of IP agents to the mesh interconnect. The mesh interconnect may be formed of a plurality of rows each having one of a plurality of horizontal interconnects and a plurality of columns each having one of a plurality of vertical interconnects;, where at least one of the plurality of rows includes an asymmetrical number of mesh stops. Other embodiments are described and claimed.

8 Claims, 9 Drawing Sheets

(58) Field of Classification Search
CPC .......... G06F 30/00; G06F 30/17; G06F 30/18; G06F 30/20; G06F 30/23; G06F 30/30; G06F 30/327; G06F 30/33; G06F 30/3312; G06F 30/34; G06F 30/36; G06F 30/39; G06F 30/392; G06F 30/394; G06F 2213/0038; G06F 13/4027
USPC ...................................................... 712/10–15
See application file for complete search history.

(56) References Cited

U.S. PATENT DOCUMENTS

| 2007/0097881 | A1* | 5/2007 | Jenkins | H04L 45/54 |
| | | | | 370/254 |
| 2011/0149981 | A1* | 6/2011 | Klausler | G06F 15/17381 |
| | | | | 370/401 |
| 2011/0179208 | A1* | 7/2011 | Koka | G06F 15/17381 |
| | | | | 710/117 |
| 2014/0092732 | A1* | 4/2014 | Mejia | H04L 45/74 |
| | | | | 370/230 |
| 2015/0006776 | A1* | 1/2015 | Liu | G06F 15/17381 |
| | | | | 710/113 |

OTHER PUBLICATIONS

U.S. Appl. No. 16/235,137, filed Dec. 28, 2018, entitled "Quality of Service (QoS) Management In Edge Computing Environments," by Frances Guim Bernat, 100 pages.

\* cited by examiner

SYSTEM, APPARATUS AND METHOD FOR INCREASING BANDWIDTH OF EDGE-LOCATED AGENTS OF AN INTEGRATED CIRCUIT

TECHNICAL FIELD

Embodiments relate to communication via interconnects on an integrated circuit.

BACKGROUND

In modern integrated circuits, many different components are present within the integrated circuit. Such components include processor cores and other types of processing units, sensors, memories, input/output devices and so forth. Some or all of these different components connect together via different interconnection schemes. In some integrated circuits components may couple together via dedicated interconnects such point-to-point interconnects. Buses also may be used to connect together different components.

Still further, some type of interconnection fabric may be used to couple devices together. In some integrated circuits, such interconnection fabrics include mesh interconnects, where different components couple to different points of the mesh interconnect to communicate between the devices. Depending upon a particular implementation, certain components within the integrated circuit may be bandwidth constrained for injecting messages via the mesh interconnect due to their location in the integrated circuit, which may adversely impact performance.

DETAILED DESCRIPTION

In various embodiments, an integrated circuit such as a system on chip (SoC) or other multicore processor may be formed with an interconnection fabric that interconnects together processor cores and/or other intellectual property (IP) agents. Generically, cores and other IP agents are referred to herein as "IP agents." While different forms of this interconnection fabric are possible, in representative embodiments described herein a mesh interconnect is used to couple together the IP agents. Further, to ensure that agents located at a periphery of the design are accommodated with sufficient bandwidth for communication of messages, embodiments provide so-called turn agents, which may be implemented as buffer structures used to store and re-route messages intended for communication on a given direction of the mesh interconnect via another direction of the mesh interconnect. More particularly, a representative embodiment described herein provides such turn agents associated with mesh stops that couple one or more IP agents to the mesh interconnect.

In general, an integrated circuit may be configured such that all IP agents inject messages only via a single direction on the mesh interconnect (e.g., horizontally or vertically). In a particular implementation described herein, this configured direction is in the vertical direction. With turn agents associated with peripheral IP agents, these IP agents may inject messages in multiple directions, namely both vertical and horizontal directions, to enable improved bandwidth for these devices, which otherwise would suffer from limited bandwidth, as they would only be able to inject messages in a single way of this one (e.g., vertical) direction.

Figure 1:
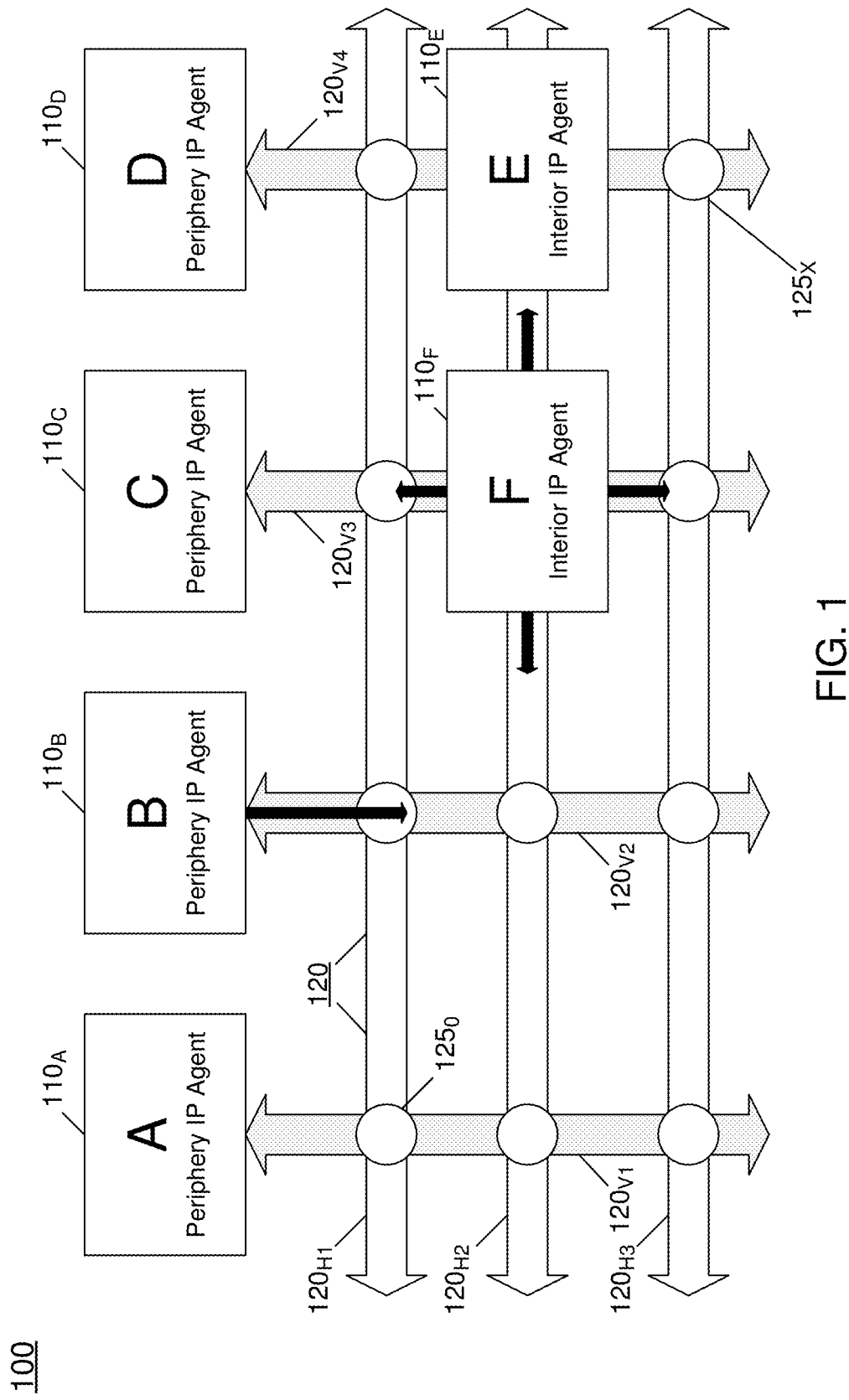
FIG. 1 is a block diagram of an integrated circuit in accordance with an embodiment of the present invention.

Referring now to FIG. 1, shown is a block diagram of an integrated circuit in accordance with an embodiment of the present invention. As shown in FIG. 1, integrated circuit 100 is a given SoC that includes a plurality of intellectual property agents $110_A$-$110_F$ (generically "agents 110" or "IP agents 110"). Note that only a subset of representative IP agents are shown, and in a given actual implementation, more agents may be present. In an embodiment, agents 110 are coupled together via a mesh interconnect 120. Agents 110 and mesh interconnect 120 may be formed on a single semiconductor die. However, in other cases such agents may span across multiple die implemented within a given IC package such as a multichip module. Nevertheless for purposes of discussion of representative embodiments, assume that agents 110 shown in FIG. 1 are implemented, along with mesh interconnect 120, on a single semiconductor die.

With further reference to FIG. 1, note that mesh interconnect 120 itself is implemented of individual interconnects running in the horizontal and vertical directions. More specifically, interconnects $120_{H1-H3}$ are provided in the horizontal direction and interconnects $120_{V1-V4}$ are provided in the vertical direction. With this mesh interconnect arrangement, IP agents 110 may communicate with each other. Understand that while a limited and representative number of horizontal and vertical interconnects are shown in FIG. 1, in different implementations a much larger number of such interconnects may form a mesh interconnect, particularly in embodiments of SoCs that may include a large number of cores or other IP agents, e.g., 32 or 64-core implementations.

As described above, in a conventional configuration of such a mesh interconnect, IP agents 110 are typically configured to source messages onto mesh interconnect 120 in a single one of the vertical and horizontal directions. This is so, as even though agents 110 are provided connectivity to both the horizontal and vertical interconnects $120_{H,V}$ of mesh interconnect 120, in order to reduce design complexity, the injection of traffic onto mesh interconnect 120 by IP agents 110 may be limited to a particular direction in typical implementations. Without an embodiment and with a typical configuration, IP agents 110 would be configured to only inject traffic along the vertical direction. This helps simplify injection logic routing tables associated with the traffic. Note that with this conventional arrangement, IP agents that are at a periphery of mesh interconnect 120 (which in the implementation of FIG. 1 include IP agents $110_A$-$110_D$) would have half the bandwidth capability of IP agents at an interior of mesh interconnect 100, such as IP agents $110_{E,F}$. Thus as shown in FIG. 1, IP agents $110_{E,F}$ can communicate packets vertically in both ways (i.e., north and south in the vertical direction), realizing, in a conventional arrangement, twice the bandwidth that could be realized by IP agents $110_{A-D}$.

Such limited bandwidth of at least peripheral IP agents 110 could be significant when these peripheral or edge IP agents are high bandwidth agents. In typical SoC designs, IP agents on the edges tend to be agents that connect to external buses such as memory buses, cache coherent buses or IO buses. In addition, as technology advances, there is a continuous push to increase connectivity bandwidth due to multiple factors. These factors include increased network speeds. For example, the industry is enabling 200 Gb Ethernet cards today and is expected to transition to 400 Gb Ethernet cards in 2020. This will double the per IO agent bandwidth from 50 GB/s to 100 GB/s. In addition, many communication protocols seek to introduce higher speeds. For example, it is anticipated that Peripheral Component Interconnect Express (PCIe) Gen5 will run at 32 GT/s, and result in bandwidths at 100+GB/s, also in the 2020 timeframe. In addition, as memory bandwidth of a platform continues to increase, coherent interconnect bandwidth may scale to keep the inter-socket bandwidth scaling proportionally.

As such, edge devices may be configured in accordance with embodiments to enable injection in multiple mesh interconnect directions to realize more injection bandwidth than is available due to their location. Although the scope of the present invention is not limited in this regard, in an embodiment with dual-direction injection from peripheral IP agents, bandwidths as high as 128 Gigabytes per second (GB/s) may be realized. Still further, techniques herein enable this higher bandwidth without increasing the operation frequency of the mesh interconnect (reducing power consumption and/or die area), and without providing additional stops to the agent, which could constrain design requirements.

As such in embodiments, IP agents 110 coupled at a periphery of mesh interconnect 120 may be configured to source messages in both horizontal and vertical directions. In different implementations, all such peripheral IP agents may be provided with this capability to source messages in both horizontal and vertical directions. In other cases, only one or some subset of peripheral IP agents may be configured for this dual-direction message sourcing.

To effect this ability to communicate messages in both horizontal and vertical directions on mesh interconnect 120, turn agents may be provided in association with peripheral IP agents that are to be configured for dual direction sourcing. More particularly in embodiments herein, such turn agents may be included in or otherwise associated with mesh stops that are formed as connection points between horizontal and vertical interconnects of the mesh interconnect. In the high level illustrated in FIG. 1, a plurality of mesh stops $125_0$-$125_x$ are provided, each located in association with an intersection between a corresponding horizontal interconnect $120_H$ and a corresponding vertical interconnect $120_V$. Understand while shown at this high level in the embodiment of FIG. 1, many variations and alternatives are possible.

Figure 2:
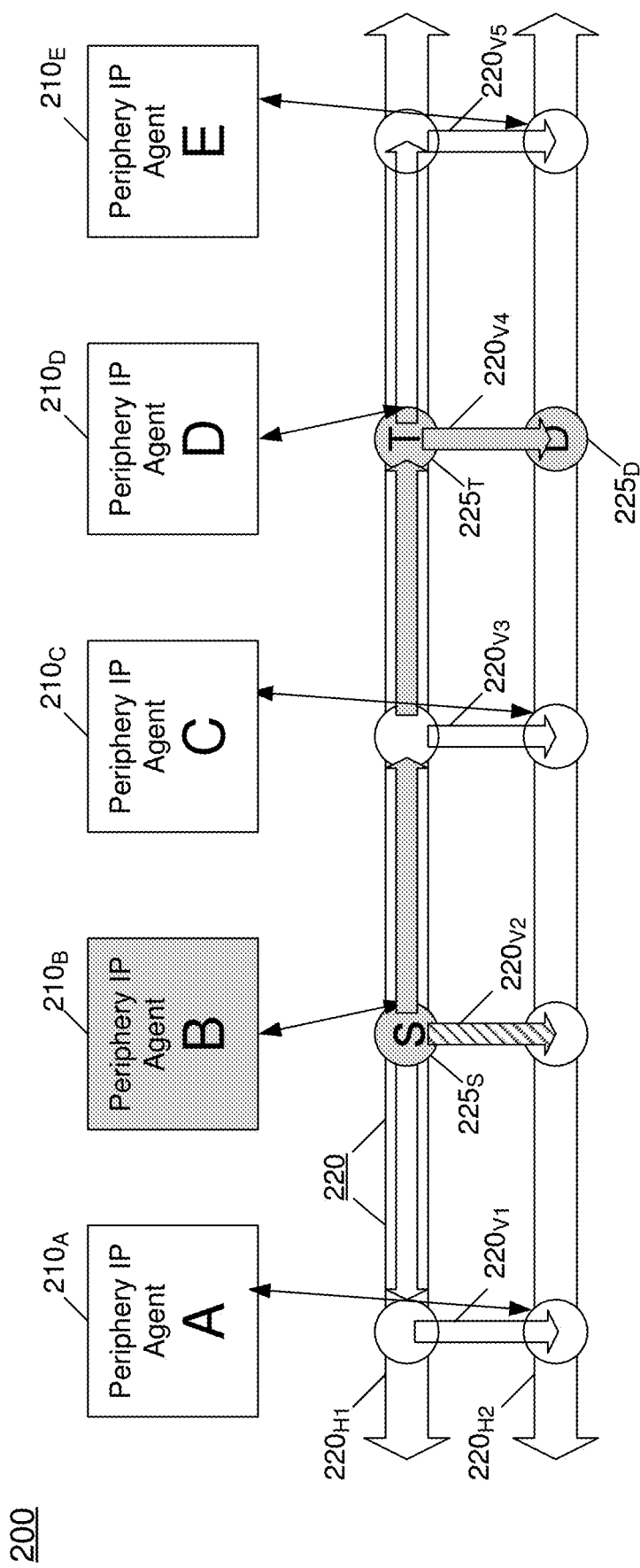
FIG. 2 is a block diagram of a portion of a SoC in accordance with another embodiment of the present invention.

Referring now to FIG. 2, shown is a block diagram of a portion of a SoC in accordance with another embodiment of the present invention. As shown in FIG. 2, a portion of an integrated circuit 200 includes multiple agents $210_A$-$210_E$ that couple together via a mesh interconnect 220 including multiple horizontal interconnects $220_{H1-H2}$ and multiple vertical interconnects $220_{V1-V5}$. Note that in this limited view in FIG. 2, focus is on agent $210_B$, which is enabled, via inclusion of a turn agent in an associated mesh stop $225_S$, to inject messages in a horizontal direction. Thus as illustrated, via inclusion of a turn agent in mesh stop $225_S$, IP agent $210_B$ injects packets or other messages into mesh interconnect 220 at mesh stop $225_S$ in the horizontal direction, and mesh stop $225_T$ is configured to re-route this traffic to mesh stop $225_D$, which in turn may couple to a destination IP agent (not shown for ease of illustration in FIG. 2).

Depending upon a desired configuration, note that mesh stops associated with all of agents $210_A$-$210_E$ may be configured with turn agents to enable these IP agents to source packets horizontally as well as vertically. It is also possible for a given SoC instantiation to independently and individually include turn agents for only a single one or some subset of mesh stops associated with peripheral agents and not for others. In this way, some peripheral IP agents may be enabled to source messages in both horizontal and vertical directions of a mesh interconnect, while other peripheral agents may be configured to source messages in only a single one of vertical and horizontal directions. Understand while shown at this high level in the embodiment of FIG. 2, many variations and alternatives are possible.

Figure 3:
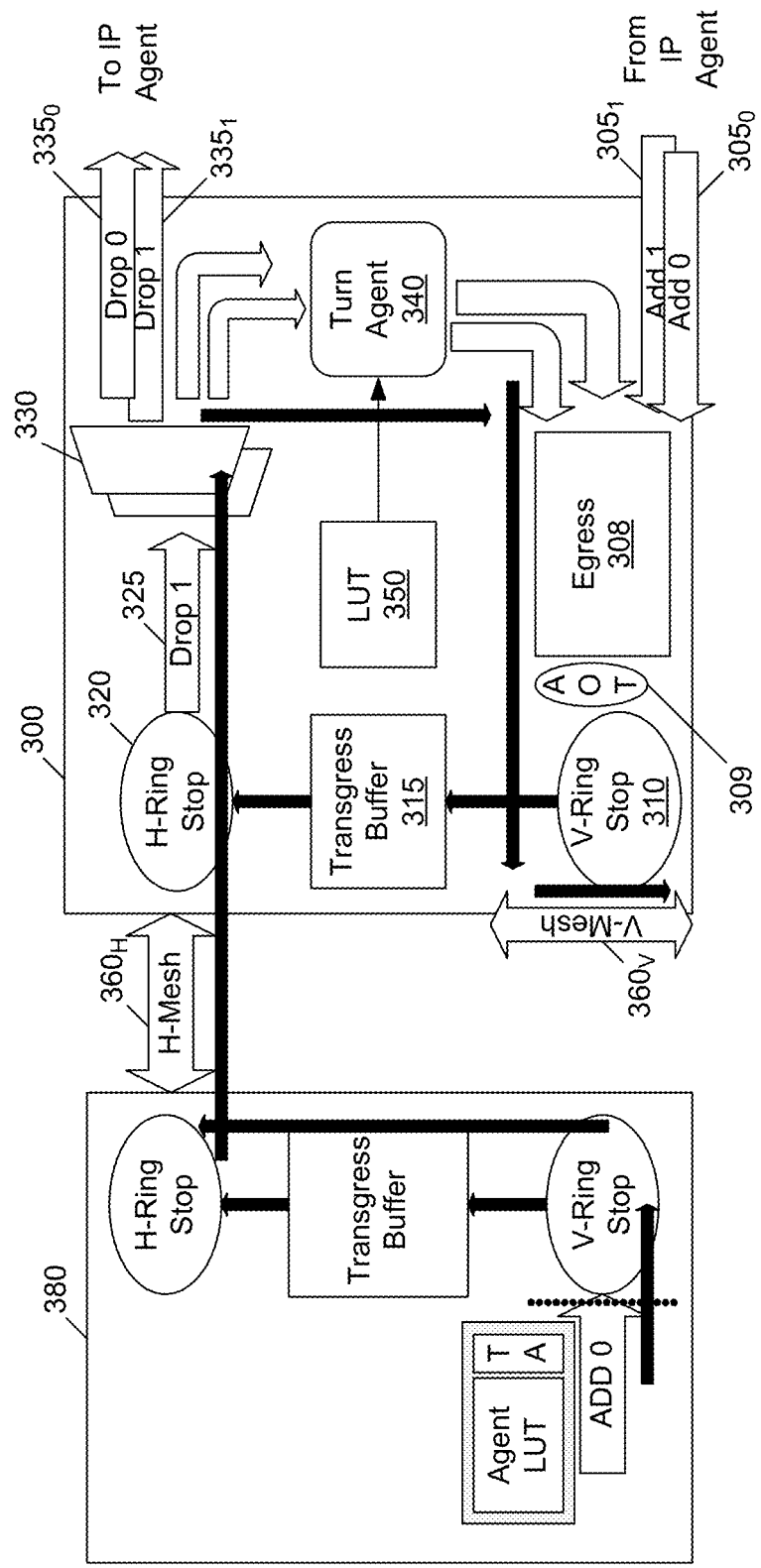
FIG. 3 is a detailed block diagram of a mesh stop in accordance with an embodiment of the present invention.

Referring now to FIG. 3, shown is a more detailed block diagram of a representative mesh stop including a turn agent in accordance with an embodiment of the present invention. As shown in FIG. 3, a mesh stop 300 couples between a horizontal mesh interconnect $360_H$ and a vertical mesh interconnect $360_V$. While the details of a single mesh stop 300 are shown in FIG. 3, note that a portion of another mesh stop 380 also is illustrated. Mesh stop 380 is a conventional mesh stop not including a turn agent.

With reference to mesh stop 300, incoming packets sourced by IP agents are received via input lines $305_{0,1}$ and into a set of egress buffers 308, via an age order matrix (AOT) 309, a queue structure that records age information per entry and enforces first-in first-out order per a quality mask. From there, such messages are provided to a ring stop 310, more specifically a vertical ring stop, which according to typical convention of the SoC design injects packets via vertical mesh interconnect $360_V$. In addition, to allow certain messages received within mesh stop 300 from another mesh stop (and not a true source packet from an IP agent directly coupled to mesh stop 300) to change direction at ring stop 300, these messages instead proceed from ring stop 310 to a transgress buffer 315 and thereafter to another ring stop 320, namely a horizontal ring stop, so that messages may be communicated via horizontal mesh interconnect $360_H$. In an embodiment, transgress buffer 315 may include a plurality of entries, each to store messages on a path from ring stop 310 to ring stop 320. In embodiments, transgress buffer 315 may be implemented as a first-in-first-out (FIFO) buffer including multiple entries to store such messages.

Furthermore, messages that are to be sunk to IP agents directly coupled to ring stop 300 may proceed from ring stop 320 via communication line 325 to a selection circuit 330, e.g., implemented as a multiplexer. When selection circuit 330 is to direct messages to directly coupled agents, it is controlled to output such messages via a given one of output lines $335_0$-$335_1$ to a given sink IP agent.

Still further with embodiments herein, to enable a turn to occur such that incoming source messages from a directly coupled IP agent can be re-routed to horizontal mesh interconnect $360_H$, selection circuit 330 may be controlled to direct such messages to a turn agent 340. In an embodiment, turn agent 340 may include buffer circuitry, such as a FIFO buffer including a plurality of entries to buffer such messages and re-route them via communication through egress buffers 308. In a particular embodiment, turn agent 340 may include, e.g., 24 entries and can be implemented with multiple read and write ports. In addition, turn agent 340 may include control circuitry to control operation of the buffer so that messages can be provided with appropriate information and sent along to an appropriate destination.

As further illustrated in FIG. 3, control of where to direct given messages may proceed based on information stored in at least one lookup table 350. Such lookup table may be implemented as a routing table that includes entries each associated with a given destination IP agent and which stores routing information. More specifically, using a destination identifier of a given message, lookup table 350 may be accessed to determine a next destination for the message in its communication from a given source IP agent to a given destination IP agent. In a particular embodiment, lookup table 350 may have a plurality of entries each including multiple fields including a next destination field to identify a next destination for the message, a turn agent field to indicate whether a packet is to be re-routed via an associated turn agent of the mesh stop, and a valid field to indicate whether, at the present time, the given entry is valid or not.

In an embodiment, routing tables as implemented within one or more lookup tables (per mesh stop) may be adapted to indicate that a static route for traffic between a given source IP agent and a destination IP agent is to be routed via a turn agent. With this routing information, traffic from this source IP agent is injected onto an interconnect mesh towards the turn agent. In an embodiment, certain design constraints may simplify implementation. In the example of FIG. 3, an injecting IP agent injects data typically on the vertical direction and sinks incoming traffic on the horizontal direction. Transgress buffer 315 enables traffic to be directed from the vertical mesh to horizontal mesh. In the case where a sender and receiver are on the same mesh stop, transgress buffer 315 can be used to hold the packets that are for the co-located agent without performing a mesh injection in the vertical direction. To use turn agent 340, the injecting IP agent can reuse transgress buffer 315 and inject outgoing traffic into transgress buffer 315, which then injects it onto horizontal mesh interconnect $360_H$ towards turn agent 340. In this way, a source agent (not shown in FIG. 3) at mesh stop 380 may send a packet on horizontal mesh interconnect $360_H$ to ring stop 300 and then proxy through turn agent 340 to send on vertical mesh interconnect $360_V$. Note that turn agents may be incorporated into various mesh scheduling agents including those that arbitrate for credits. Understand while shown at this high level in the embodiment of FIG. 3, many variations and alternatives are possible.

Figure 4:
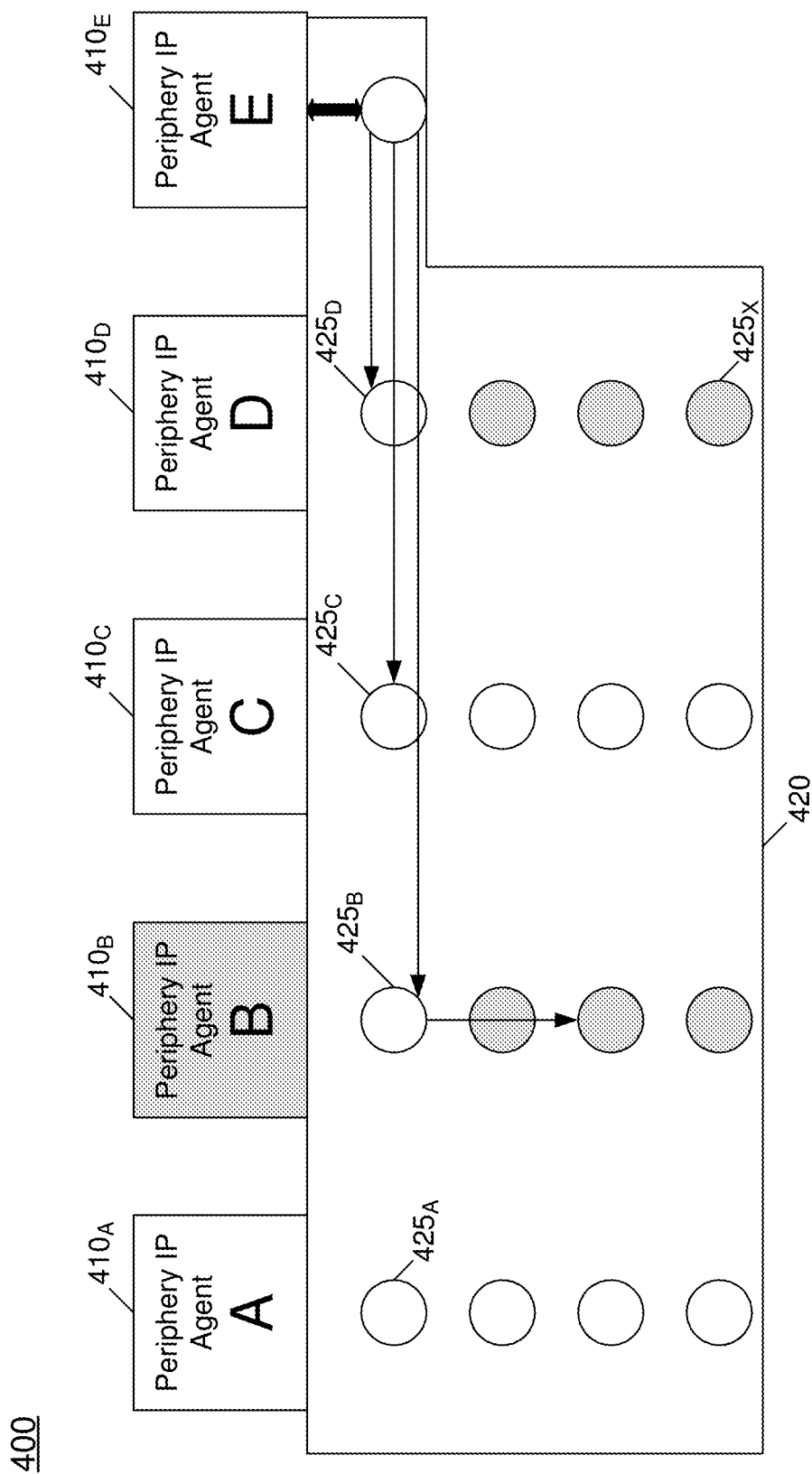
FIG. 4 is a block diagram of an SoC in accordance with another embodiment of the present invention.

Referring now to FIG. 4, shown is a block diagram of a method in accordance with another embodiment of the present invention. As shown in FIG. 4, SoC 400 includes a plurality of agents $410_A$-$410_E$, located at a periphery of the SoC. While only these four agents are shown for ease of illustration, understand that SoC 400 may include a plurality of other agents located throughout a mesh interconnect 420 formed of multiple vertical and horizontal interconnects. Illustrated in the high level of FIG. 4 are a plurality of mesh stops $425_A$-$425_X$, which as shown are located in a familiar row and column matrix. With embodiments herein there is no limitation as to having the same number of agents per row or the same number of agents per column. Thus as illustrated in FIG. 4, agent $410_E$ is the only agent present in its column. Or stated another way, a first row of SoC 400 (having IP agents $410_{A-E}$) includes at least one more agent than other rows of SoC 400. With an embodiment, a design limitation of having the same number of columns on the entire die equaling the maximum number of agents in a row can be removed. In this way, relatively lower bandwidth agents may be located without a dedicated column for the entire die, which may save significant die costs. As shown in FIG. 4, assume that IP agent $410_E$ is a relatively lower bandwidth agent. In the arrangement of FIG. 4, all traffic sourced from it may use turn agents on different columns (e.g., one of mesh stops $425_{B-D}$) to make its way to a given destination (e.g., an IP agent coupled to mesh stop $425_D$ in FIG. 4). Understand while shown at this high level in the embodiment of FIG. 4, many variations and alternatives are possible.

Figure 5:
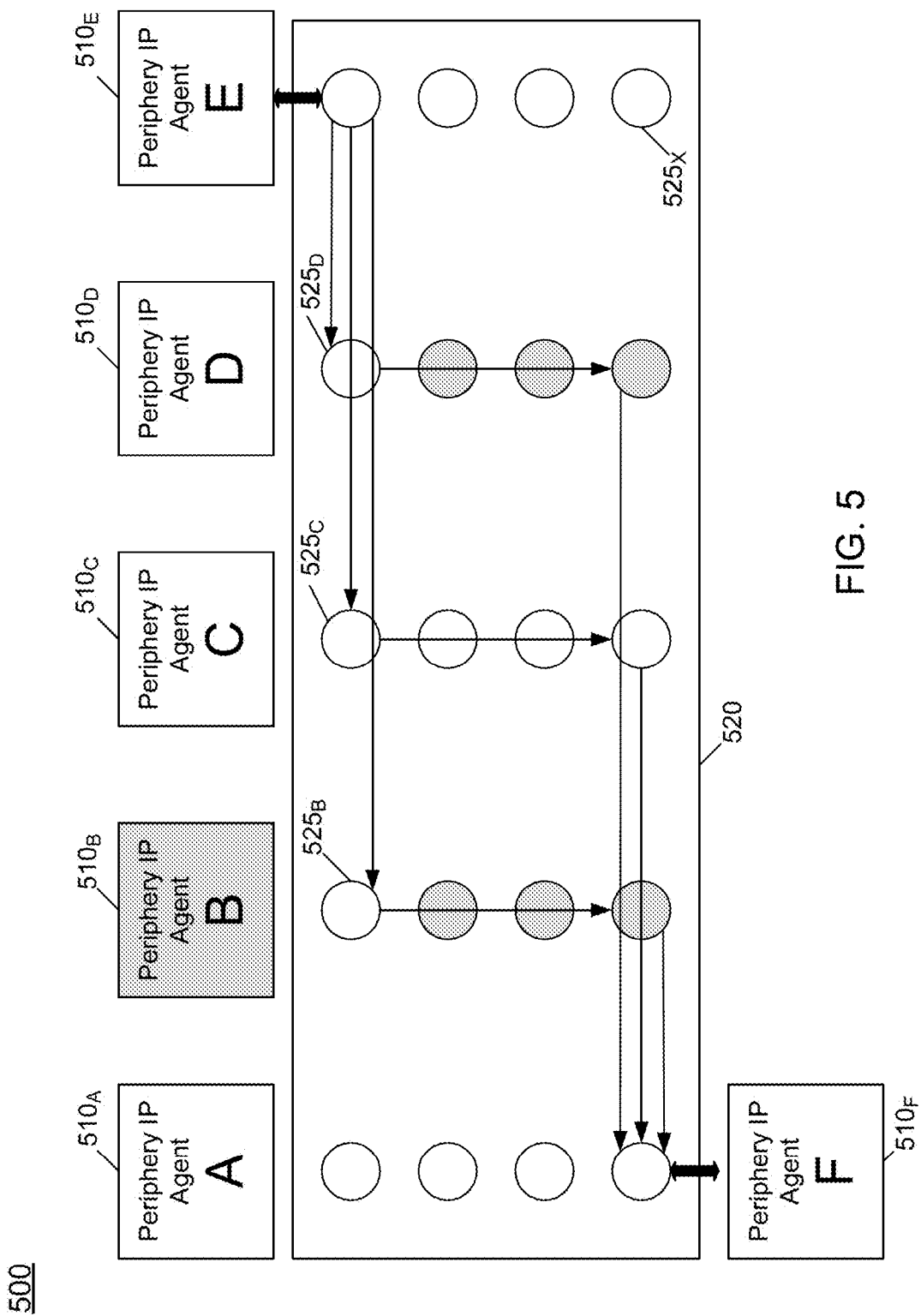
FIG. 5 shown is yet another block diagram of an SoC in accordance with another embodiment of the present invention.

Referring now to FIG. 5, shown is yet another block diagram of an SoC in accordance with another embodiment of the present invention. As shown in FIG. 5, SoC 500 includes a plurality of agents $510_A$-$510_F$, located at a periphery of the SoC. While only these five agents are shown for ease of illustration, understand that SoC 500 may include a plurality of other agents located throughout a mesh interconnect 520 formed of multiple vertical and horizontal interconnects. As illustrated in FIG. 5, multiple different communication paths may be provided between given agents (e.g., agent $510_E$ and agent $510_F$) to better distribute high bandwidth traffic between these two agents. Such accommodation may be effected by leveraging the turn agents present in different mesh stops (e.g., as present in ones of mesh stops $525_{B-D}$).

Moreover, with an embodiment, routing tables may provide for multiple paths between a source-destination pair. With multiple paths, the turn agent can be used to distribute high bandwidth traffic between a pair of agents to improve the traffic distribution on the mesh interconnect. In this way, if high bandwidth agents communicate with each other, hot spots on mesh interconnect 520 may be avoided, by distributing the traffic better. As shown in FIG. 5, IP agent $510_E$ may send high bandwidth traffic to IP agent $510_F$, via 3 possible paths, rather than a single, fixed path. Understand while shown at this high level in the embodiment of FIG. 5, many variations and alternatives are possible.

Figure 6:
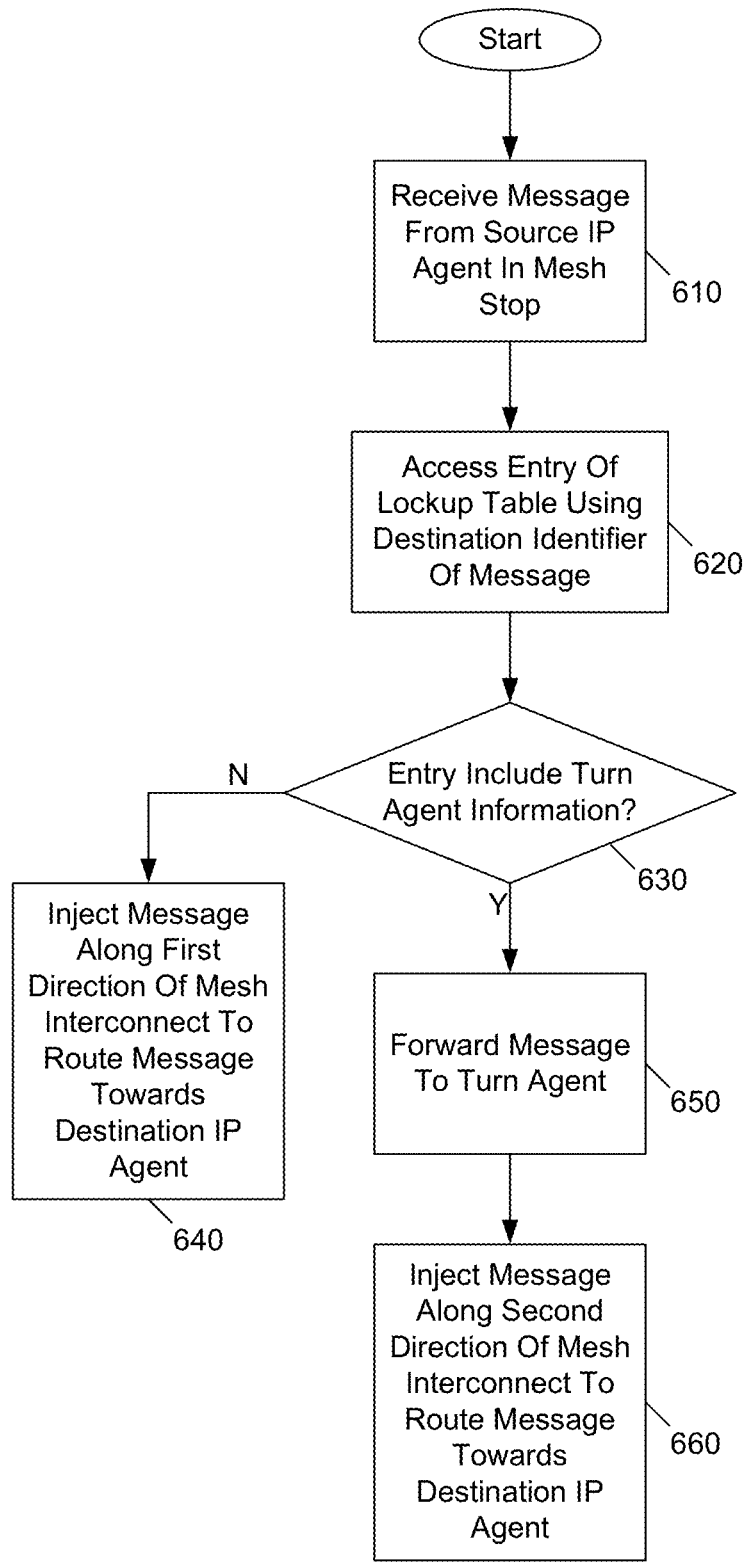
FIG. 6 is a flow diagram of a method in accordance with an embodiment of the present invention.

Referring now to FIG. 6, shown is a flow diagram of a method in accordance with an embodiment of the present invention. As shown in FIG. 6, method 600 is a method for directing communication of messages from a source IP agent to a destination IP agent via a mesh interconnect according to the techniques described herein. As such, method 600 may be performed by at least one mesh stop of the mesh interconnect. Thus method 600 can be performed by hardware circuitry, firmware, software and/or combinations thereof.

As illustrated, method 600 begins by receiving a message from a source IP agent in a mesh stop (block 610). For purposes of discussion assume that this mesh stop is directly coupled to the source IP agent and thus receives the message from the source IP agent for injection onto a selected one of a horizontal or vertical interconnect of the mesh interconnect. In an embodiment, the message may be a given transaction to be directed to the destination IP agent and may include various information including a header that provides destination information such as a destination identifier, e.g., in the form of an address or other identifier, and other header information including agent-specific information. In addition, the message may include opcode information to identify a type of message such as a given type of read request, write request, or so forth. Furthermore, the message may include a payload portion (optionally) to carry requested data.

In any event, at block 620 a lookup table of the mesh stop may be accessed using the destination identifier of the message. This lookup table may include a plurality of entries each associated with a given destination IP agent so that a lookup can be performed using the destination identifier. As described herein, in an embodiment each entry of this lookup table may include routing information, turn agent information (optionally), a valid indicator and/or other metadata.

Based on the information in the accessed entry, at diamond 630 it may be determined whether the entry includes turn agent information. As described herein, entries of the lookup table may include a field to indicate whether a turn agent of the mesh stop is to be used for routing of the message. For example, in one embodiment this turn agent field may be a single bit which when set indicates that the message is to traverse through the mesh stop via the turn agent. Of course other encodings to identify when a message is to be routed via a turn agent can be present.

If it is determined that the entry does not include turn agent information (e.g., when this field is not present or is set to 0), control passes to block 640 where the message may be injected onto the mesh interconnect along a first direction. Assume for purposes of illustration, that this first direction is a default direction, which may be the vertical direction. By way of this injection, the message begins its route towards the destination IP agent. Note that depending upon the relative locations of the source IP agent and the destination IP agent, this message may proceed through multiple hops of mesh stops in traversing a path from the source IP agent to the destination IP agent. For this conventional injection via a single direction, e.g., the vertical direction, also by default configuration, only a single change of direction between the horizontal and vertical interconnects of the mesh interconnect occurs in traversing the path from the source IP agent to the destination IP agent.

Still with reference to FIG. 6, if it is determined that the lookup table entry includes turn agent information, control passes to block 650 where the message is forwarded to the turn agent of the mesh stop. Depending upon traffic conditions, this message may be buffered within the turn agent until it reaches a top entry of the turn agent and is ready for dispatch from the mesh stop. At this point, control passes to block 660 where the message may be injected onto the mesh interconnect along a second direction, which in this example is the horizontal direction. By way of this injection, the message begins its route towards the destination IP agent. For such messages that are injected into the horizontal direction, it is further possible that by way of appropriate configuration information present, e.g., in routing tables of intermediate mesh stops, based on, e.g., traffic conditions, the message may make turns or otherwise traverse between horizontal and vertical interconnects multiple times on a path between the source IP agent and the destination IP agent. In one embodiment, there may be a limit as to the number of turns allowed in a given device. Understand while shown at this high level in the embodiment of FIG. 6, many variations and alternatives are possible.

Figure 7:
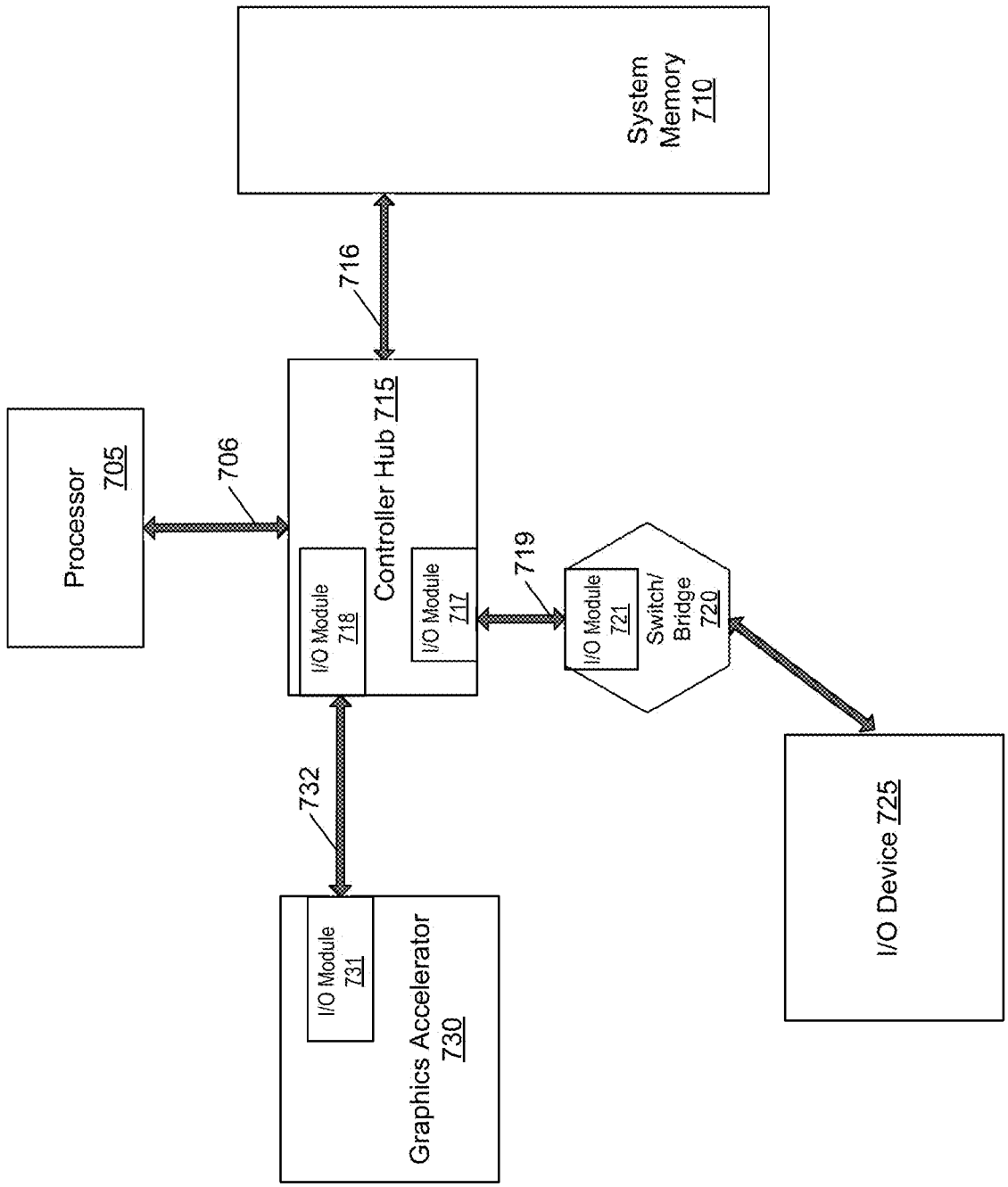
FIG. 7 is an embodiment of a fabric composed of point-to-point links that interconnect a set of components.

Embodiments may be implemented in a wide variety of interconnect structures. Referring to FIG. 7, an embodiment of a fabric composed of point-to-point links that interconnect a set of components is illustrated. System 700 includes processor 705 and system memory 710 coupled to controller hub 715. Processor 705 includes any processing element, such as a microprocessor, a host processor, an embedded processor, a co-processor, or other processor. Processor 705 is coupled to controller hub 715 through front-side bus (FSB) 706. In one embodiment, FSB 706 is a serial point-to-point interconnect. In an embodiment, processor 705 (or other components of system 700) may be implemented with one or more integrated circuits that include mesh interconnects having edge agents coupled thereto that are configured to inject packet communications in both horizontal and vertical directions, as described herein.

System memory 710 includes any memory device, such as random access memory (RAM), non-volatile (NV) memory, or other memory accessible by devices in system 700. System memory 710 is coupled to controller hub 715 through memory interface 716. Examples of a memory interface include a double-data rate (DDR) memory interface, a dual-channel DDR memory interface, and a dynamic RAM (DRAM) memory interface.

In one embodiment, controller hub 715 is a root hub, root complex, or root controller in a PCIe interconnection hierarchy. Examples of controller hub 715 include a chip set, a memory controller hub (MCH), a northbridge, an interconnect controller hub (ICH), a southbridge, and a root controller/hub. Often the term chip set refers to two physically separate controller hubs, i.e. a memory controller hub (MCH) coupled to an interconnect controller hub (ICH). Note that current systems often include the MCH integrated with processor 705, while controller 715 is to communicate with I/O devices, in a similar manner as described below. In some embodiments, peer-to-peer routing is optionally supported through root complex 715.

Here, controller hub 715 is coupled to switch/bridge 720 through serial link 719. Input/output modules 717 and 721, which may also be referred to as interfaces/ports 717 and 721, include/implement a layered protocol stack to provide communication between controller hub 715 and switch 720. In one embodiment, multiple devices are capable of being coupled to switch 720.

Switch/bridge 720 routes packets/messages from device 725 upstream, i.e., up a hierarchy towards a root complex, to controller hub 715 and downstream, i.e., down a hierarchy away from a root controller, from processor 705 or system memory 710 to device 725. Switch 720, in one embodiment, is referred to as a logical assembly of multiple virtual PCI-to-PCI bridge devices. Device 725 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices and which may be coupled via an I3C bus, as an example. Often in the PCIe vernacular, such a device is referred to as an endpoint. Although not specifically shown, device 725 may include a PCIe to PCI/PCI-X bridge to support legacy or other version PCI devices. Endpoint devices in PCIe are often classified as legacy, PCIe, or root complex integrated endpoints.

Graphics accelerator 730 is also coupled to controller hub 715 through serial link 732. In one embodiment, graphics accelerator 730 is coupled to an MCH, which is coupled to an ICH. Switch 720, and accordingly I/O device 725, is then coupled to the ICH. I/O modules 731 and 718 are also to implement a layered protocol stack to communicate between graphics accelerator 730 and controller hub 715. A graphics controller or the graphics accelerator 730 itself may be integrated in processor 705.

Figure 8:
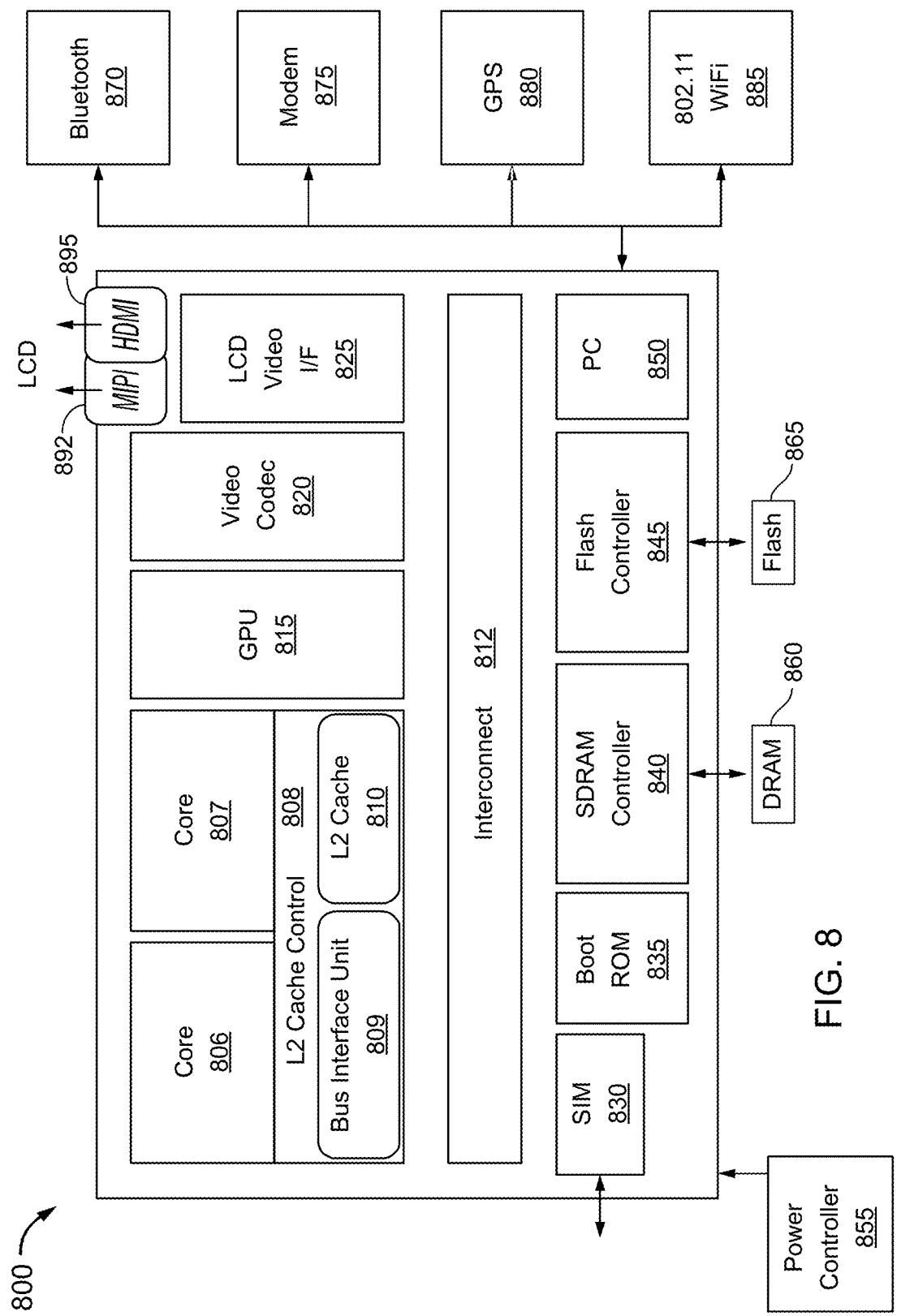
FIG. 8 is an embodiment of a system-on-chip design in accordance with an embodiment.

Turning next to FIG. 8, an embodiment of a SoC design in accordance with an embodiment is depicted. As a specific illustrative example, SoC 800 may be configured for insertion in any type of computing device, ranging from portable device to server system. Here, SoC 800 includes 2 cores 806 and 807. Cores 806 and 807 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 806 and 807 are coupled to cache control 808 that is associated with bus interface unit 809 and L2 cache 810 to communicate with other parts of system 800 via an interconnect 812.

Interconnect 812 provides communication channels to the other components, such as a Subscriber Identity Module (SIM) 830 to interface with a SIM card, a boot ROM 835 to hold boot code for execution by cores 806 and 807 to initialize and boot SoC 800, a SDRAM controller 840 to interface with external memory (e.g., DRAM 860), a flash controller 845 to interface with non-volatile memory (e.g., flash 865), a peripheral controller 850 (e.g., an eSPI interface) to interface with peripherals, video codec 820 and video interface 825 to display and receive input (e.g., touch enabled input), GPU 815 to perform graphics related computations, etc. In an embodiment, interconnect 812 may be implemented as a mesh interconnect and at least peripheral components coupled thereto may be configured to inject packet communications to destinations of SoC 800 via both horizontal and vertical directions of the mesh interconnect, as described herein. In addition, the system illustrates peripherals for communication, such as a Bluetooth module 870, 3G modem 875, GPS 880, and WiFi 885. Also included in the system is a power controller 855. Further illustrated in FIG. 8, system 800 may additional include interfaces including a MIPI interface 892, e.g., to a display and/or an HDMI interface 895 also which may couple to the same or a different display.

Figure 9:
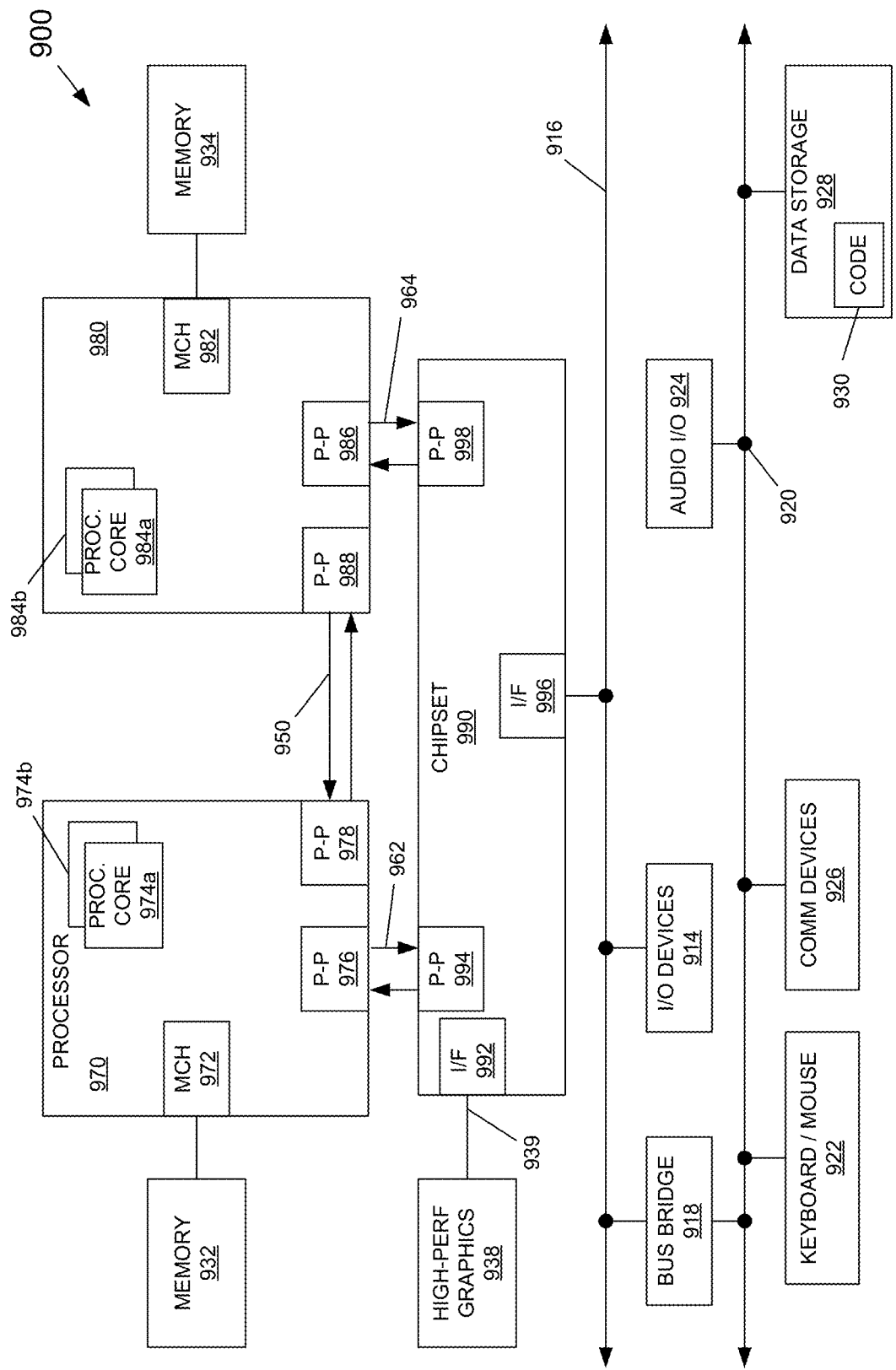
FIG. 9 is a block diagram of a system in accordance with an embodiment of the present invention.

Referring now to FIG. 9, shown is a block diagram of a system in accordance with an embodiment of the present invention. As shown in FIG. 9, multiprocessor system 900 includes a first processor 970 and a second processor 980 coupled via a point-to-point interconnect 950. As shown in FIG. 9, each of processors 970 and 980 may be many core processors including representative first and second processor cores (i.e., processor cores 974a and 974b and processor cores 984a and 984b). In an embodiment, processors 970 and 980 each may be configured on single semiconductor die including a mesh interconnect with a configuration having turn agents to allow packets to be injected on both horizontal and vertical directions of the mesh interconnect by at least certain agents, as described herein.

Still referring to FIG. 9, first processor 970 further includes a memory controller hub (MCH) 972 and point-to-point (P-P) interfaces 976 and 978. Similarly, second processor 980 includes a MCH 982 and P-P interfaces 986 and 988. As shown in FIG. 9, MCH's 972 and 982 couple the processors to respective memories, namely a memory 932 and a memory 934, which may be portions of system memory (e.g., DRAM) locally attached to the respective processors. First processor 970 and second processor 980 may be coupled to a chipset 990 via P-P interconnects 962 and 964, respectively. As shown in FIG. 9, chipset 990 includes P-P interfaces 994 and 998.

Furthermore, chipset 990 includes an interface 992 to couple chipset 990 with a high performance graphics engine 938, by a P-P interconnect 939. As shown in FIG. 9, various input/output (I/O) devices 914 may be coupled to first bus 916, along with a bus bridge 918 which couples first bus 916 to a second bus 920. Various devices may be coupled to second bus 920 including, for example, a keyboard/mouse 922, communication devices 926 and a data storage unit 928 such as a disk drive or other mass storage device which may include code 930, in one embodiment. Further, an audio I/O 924 may be coupled to second bus 920.

The following examples pertain to further embodiments.

In one example, an apparatus includes: a plurality of IP agents; a mesh interconnect to couple the plurality of IP agents; and a plurality of mesh stops each to couple one or more of the plurality of IP agents to the mesh interconnect, where at least some of the plurality of mesh stops include a turn agent to re-route a message, injected into the mesh stop by a source IP agent configured to communicate in a single direction on the mesh interconnect, onto the mesh interconnect in a second direction different than the single direction.

In an example, the mesh stop comprises: a first ring stop to couple to the mesh interconnect in the second direction; a second ring stop to couple to the mesh interconnect in the single direction; a transgress buffer coupled between the second ring stop and the first ring stop; and a first selector coupled to the first ring stop, the first selector to direct messages to one of a first IP agent and the turn agent based on routing information associated with the message.

In an example, the turn agent comprises a buffer to store a plurality of messages, the turn agent coupled between the first selector and the second ring stop.

In an example, the apparatus further comprises a lookup table including a plurality of entries, each of the plurality of entries associated with a destination IP agent, and including: a first field to store a next direction on the mesh interconnect for communication of a message; a second field to store turn agent information to indicate whether a turn agent is to be used for the communication of the message; and a valid field to indicate whether the entry is valid.

In an example, the lookup table is to be indexed using a destination identifier of the message.

In an example, the at least some of the plurality of mesh stops including the turn agent are associated with peripheral IP agents.

In an example, a subset of the plurality of mesh stops do not include the turn agent, the subset of the plurality of mesh stops associated with internal IP agents.

In an example, the apparatus comprises a system on chip having the plurality of IP agents arranged in a plurality of columns, at least some of the plurality of columns having different numbers of IP agents.

In an example, a first column of the plurality of columns comprises a single IP agent, where messages sourced from the single IP agent are to use turn agents of different mesh stops to re-route the messages.

In another example, a method comprises: receiving, in a mesh stop of a mesh interconnect of a system on chip, a message from a source IP agent of the SoC; accessing an entry in a lookup table using a destination identifier of the message, the entry associated with a destination IP agent corresponding to the destination identifier; determining whether the entry includes turn agent information; responsive to determining that the entry does not include the turn agent information, injecting the message along a first direction of the mesh interconnect towards the destination IP agent based on routing information stored in the entry of the lookup table; and responsive to determining that the entry includes the turn agent information, forwarding the message to a turn agent of the mesh stop, and thereafter injecting the message along a second direction of the mesh interconnect towards the destination IP agent based on the routing information stored in the entry of the lookup table.

In an example, the method further comprises determining whether a valid indicator of the entry of the lookup table is valid and forwarding the message to the turn agent further responsive to the valid indicator indicating that the entry is valid.

In an example, the method further comprises receiving the message from the source IP agent comprising an edge agent of the SoC.

In an example, the method further comprises receiving the message from the source IP agent comprising a sole agent coupled to a first vertical interconnect of the mesh interconnect, where a plurality of other vertical interconnects of the mesh interconnect have a plurality of IP agents coupled thereto.

In an example, the method further comprises: receiving, in a second mesh stop of the mesh interconnect, a second message from a second source IP agent; accessing an entry of a second lookup table using a destination identifier of the second message, the second lookup table not including the turn agent information; and injecting the second message along the first direction of the mesh interconnect based on routing information stored in the entry of the lookup table, towards a second destination IP agent.

In an example, the method further comprises: directing a first subset of messages from the source IP agent towards the destination IP agent from the mesh stop along the first direction of the mesh interconnect; and directing a second subset of messages from the source IP agent towards the destination IP agent from the mesh stop along the second direction of the mesh interconnect.

In an example, the method further comprises directing the first subset and the second subset based at least in part on traffic conditions on the mesh interconnect.

In another example, a computer readable medium including instructions is to perform the method of any of the above examples.

In a further example, a computer readable medium including data is to be used by at least one machine to fabricate at least one integrated circuit to perform the method of any one of the above examples.

In a still further example, an apparatus comprises means for performing the method of any one of the above examples.

In another example, a system comprises: a SoC and a system memory coupled to the SoC. The SoC may include: a plurality of IP agents formed on a semiconductor die; a mesh interconnect formed on the semiconductor die to couple the plurality of IP agents, the mesh interconnect formed of a plurality of rows each having one of a plurality of horizontal interconnects and a plurality of columns each having one of a plurality of vertical interconnects; and a plurality of mesh stops each to couple one or more of the plurality of IP agents to the mesh interconnect, where at least one of the plurality of rows includes an asymmetrical number of mesh stops.

In an example, a first mesh stop of the asymmetrical number of mesh stops comprises a turn agent to re-route a message, injected into the first mesh stop by a source IP agent, onto the mesh interconnect via a first horizontal interconnect of the plurality of horizontal interconnects.

In an example, a plurality of other mesh stops of the asymmetrical number of mesh stops comprises a turn agent to direct a portion of messages from the source IP agent from the first horizontal interconnect to one of the plurality of vertical interconnects on one of a plurality of paths through the mesh interconnect from the source IP agent to a destination IP agent.

In an example, a first subset of the plurality of columns each includes a symmetrical number of IP agents and at least one column of the plurality of columns includes a number of IP agents different than the symmetrical number of IP agents.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   a plurality of cores;
   a mesh interconnect to couple the plurality of cores; and
   a plurality of mesh stops each to couple one or more of the plurality of cores to the mesh interconnect, wherein at least one of the plurality of mesh stops comprises:
   a turn agent to re-route a first message, injected into the at least one of the plurality of mesh stops by a source core configured to communicate in a single direction on the mesh interconnect, onto the mesh interconnect in a second direction different than the single direction;

a first ring stop to couple to the mesh interconnect in the second direction;

a second ring stop to couple to the mesh interconnect in the single direction;

a transgress buffer coupled between the second ring stop and the first ring stop; and a first selector coupled to the first ring stop, the first selector to direct the first message towards one of a first core and the turn agent based on routing information associated with the first message.

2. The apparatus of claim 1, wherein a buffer of the turn agent is to store a plurality of messages, the turn agent coupled between the first selector and the second ring stop.

3. The apparatus of claim 1, further comprising a lookup table including a plurality of entries, each of the plurality of entries associated with a destination core, and including:

a first field to store a next direction on the mesh interconnect for communication of a second message;

a second field to store turn agent information to indicate whether the turn agent is to be used for the communication of the second message; and a valid field to indicate whether the entry is valid.

4. The apparatus of claim 3, wherein the lookup table is to be indexed using a destination identifier of the second message.

5. The apparatus of claim 1, wherein the at least one mesh stop of the plurality of mesh stops including the turn agent is associated with peripheral cores.

6. The apparatus of claim 5, wherein a subset of the plurality of mesh stops do not include the turn agent, the subset of the plurality of mesh stops associated with internal cores.

7. The apparatus of claim 1, wherein the apparatus comprises a system on chip having the plurality of cores arranged in a plurality of columns, at least one column of the plurality of columns having different numbers of cores.

8. The apparatus of claim 7, wherein a first column of the plurality of columns comprises a single core, wherein a plurality of messages sourced from the single core are to use turn agents of different mesh stops to re-route the plurality of messages.

* * * * *